(12) United States Patent
Sato et al.

(10) Patent No.: US 9,751,441 B2
(45) Date of Patent: Sep. 5, 2017

(54) COVER ANCHOR CLIP

(71) Applicants: NIFCO INC., Yokosuka-shi (Kanagawa) (JP); TOYOTA BOSHOKU KABUSHIKI KAISHA, Kariya-shi (Aichi) (JP)

(72) Inventors: Takehiro Sato, Yokosuka (JP); Ryuji Tsunoda, Yokosuka (JP); Ryo Yasuda, Kariya (JP)

(73) Assignees: NIFCO INC., Yokosuka-Shi, Kanagawa (JP); TOYOTA BOSHOKU KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 15/081,205

(22) Filed: Mar. 25, 2016

(65) Prior Publication Data

US 2016/0280105 A1    Sep. 29, 2016

(30) Foreign Application Priority Data

Mar. 27, 2015 (JP) ................. 2015-066227

(51) Int. Cl.
*A47C 7/02* (2006.01)
*B60N 2/58* (2006.01)

(52) U.S. Cl.
CPC .................. *B60N 2/5825* (2013.01)

(58) Field of Classification Search
CPC .................................................. B60N 2/5825
USPC ................. 297/452.6, 452.61, 218.2; 24/297
See application file for complete search history.

(56) References Cited

U.S. PATENT DOCUMENTS

| | | | | |
|---|---|---|---|---|
| 5,900,303 A | * | 5/1999 | Billarant | A44B 18/0076 24/442 |
| 6,899,399 B2 | * | 5/2005 | Ali | B60N 2/5825 297/452.6 |
| 7,487,575 B2 | * | 2/2009 | Smith | B60N 2/5825 24/297 |

(Continued)

FOREIGN PATENT DOCUMENTS

| | | |
|---|---|---|
| DE | 20 2013 101248 U1 | 6/2014 |
| DE | 10 2014 011341 A1 | 2/2015 |
| JP | 2011-069417 | 4/2011 |

OTHER PUBLICATIONS

Extended European Search Report (EESR) Application No. 161612692-1754 mailed Jul. 28, 2016, 7 pages.

*Primary Examiner* — David R Dunn
*Assistant Examiner* — Alexander Harrison
(74) *Attorney, Agent, or Firm* — Thomas | Horstemeyer, LLP

(57) ABSTRACT

A cover anchor clip comprising a base section; an anchor portion including a pair of extension portions that stands up from the base section so as to face each other, a pair of anchor claws that is formed at respective leading ends of the pair of extension portions and that projects out toward sides where the extension portions mutually face each other, and a protrusion that is formed at each leading end of the extension portions and that projects out to the opposite side to the mutually facing sides of the extension portions; and upstanding portions standing up from the base section, each of the upstanding portions can make contact with either one of the protrusions in the event that either one of the extension portions is elastically deformed and the pair of anchor claws move away from each other.

4 Claims, 11 Drawing Sheets

(56) References Cited

U.S. PATENT DOCUMENTS

| | | | | |
|---|---|---|---|---|
| 8,099,837 B2* | 1/2012 | Santin | ............... | A47C 31/023 |
| | | | | 24/297 |
| 8,197,010 B2* | 6/2012 | Galbreath | ............ | B60N 2/5825 |
| | | | | 297/218.2 |
| 8,690,257 B2* | 4/2014 | Stiller | ............... | B60N 2/5825 |
| | | | | 24/297 |
| 8,857,018 B2* | 10/2014 | Murasaki | ............ | A47C 31/023 |
| | | | | 24/297 |
| 2008/0258523 A1* | 10/2008 | Santin | ............... | B60N 2/5825 |
| | | | | 297/218.2 |
| 2016/0023581 A1* | 1/2016 | Kheil | ............... | B60N 2/5891 |
| | | | | 297/452.61 |

* cited by examiner

COVER ANCHOR CLIP

CROSS-REFERENCE TO RELATED APPLICATION

This application claims priority under 35 USC 119 from Japanese Patent Application No. 2015-66227 filed Mar. 27, 2015, the disclosure of which is incorporated by reference herein in its entirely.

BACKGROUND

Technical Field

Preferred embodiments relate to a cover anchor clip.

Related Art

A clip (cover anchor clip) described in JPA No. 2011-69417 includes a plate shaped base section retained in a foam body, a pair of opposing wall portions that stand up from the base section, anchor portions provided capable of elastic deformation toward the outside of the wall portions, and anchor claws that project out from inner faces of the anchor portions, and that anchor a fixed member attached to a seat cover for covering the foam body and inserted between the wall portions. The cover anchor clip is employed in a vehicle seat.

Note that roller crushing is performed on the foam body following molding of the foam body (cushion) employed in the seat. Specifically, the size of air bubbles inside the foam body is regulated by rolling a roller over the foam body while pressing on the foam body.

In cases in which the cover anchor clip is disposed inside the foam body, it is conceivable that the cover anchor clip may be squashed and damaged by the roller crushing.

SUMMARY

In consideration of the above circumstances, an object of preferred embodiments is to suppress damaging a cover anchor clip when roller crushing is performed.

A cover anchor clip of a first aspect of the disclosure includes: a plate shaped base section for retention in a foam body; an anchor portion including a pair of extension portions that stand up from the base section and that are disposed facing each other, a pair of anchor claws that are formed at respective leading ends of the pair of extension portions, and that project out toward sides in which the pair of extension portions mutually face each other so that the pair of anchor claws are configured to anchor an anchored member attached to a cover for covering the foam body when the anchored member is inserted between the pair of anchor claws, and a protrusion that is formed at each leading end of the pair of extension portions and that projects out to the opposite side to the mutually facing sides of the pair of extension portions; and upstanding portions each of that stands up from the base section and each of that can make contact with either one of the protrusions in the event that either one of the extension portions undergoes elastic deformation such that the pair of anchor claws move away from each other.

In the above configuration, the size of air bubbles inside the foam body is regulated by a roller rolling over the foam body while pressing on the foam body when performing roller crushing following formation of the foam body. A squashing force from the roller also acts on the anchor portion due to pressing the roller against the foam body.

Due to the squashing force acting on the anchor portion from the roller, either one of the protrusions formed on the leading ends of the extension portions makes contact with the upstanding portion when the extension portion undergoes elastic deformation such that the pair of anchor claws move away from each other. The extension portions are thereby suppressed from being excessively deformed.

In this manner, the cover anchor clip can be suppressed from being damaged when roller crushing is performed.

A cover anchor clip of a second aspect of the disclosure is the cover anchor clip of the first aspect, wherein a top face is formed to each leading end of the upstanding portions so as to face toward an upstanding direction the upstanding portion stands up in, and a contact face is formed to each of the protrusions so as to make contact with the top face.

In the above configuration, the contact face of the protrusion makes contact with the top face of the upstanding portion when the extension portion undergoes elastic deformation such that the pair of anchor claws move away from each other due to the squashing force that acts on the anchor portion from the roller when roller crushing is performed. Note that the top face formed at the leading end of the upstanding portion faces toward the upstanding direction the upstanding portion stand up in.

In cases in which, for example, the squashing force from the roller acts on the anchor portion from the upstanding direction of the upstanding portion, the upstanding portion can accordingly be suppressed from deforming even when the squashing force from the upstanding direction is transmitted to the upstanding portion through the protrusion.

A cover anchor clip of a third aspect of the disclosure is the cover anchor clip of the first aspect or the second aspect, wherein, in a state in which the pair of extension portions undergo elastic deformation in order to insert and anchor the anchored member between the pair of anchor claws, a gap is respectively formed between the protrusions and the upstanding portions.

In the above configuration, in a state in which the pair of extension portions undergo elastic deformation in order to insert and anchor the anchored member between the pair of anchor claws, a gap is formed between each of the protrusions and each of the upstanding portions. An efficiency of an attachment operation to anchor the anchored portions to the pair of anchor claws can thereby be not affected.

A cover anchor clip of a fourth aspect of the disclosure is the cover anchor clip of any of the first aspect to the third aspect, wherein the pair of extension portions are angled so as to be further apart from each other at leading ends thereof than at base ends thereof.

In the above configuration, the pair of extension portions are angled so as to be further apart from each other at leading ends than at base ends. The extension portions can thereby undergo elastic deformation such that the leading ends of the pair of extension portions move away from each other due to the squashing force from the roller acting on the anchor portion when roller crushing is performed.

According to the present disclosure, damage to the cover anchor clip when roller crushing is performed can be suppressed.

BRIEF DESCRIPTION OF THE DRAWINGS

Preferred embodiments will be described in detail based on the following figures, wherein.

DETAILED DESCRIPTION

Figure 1:
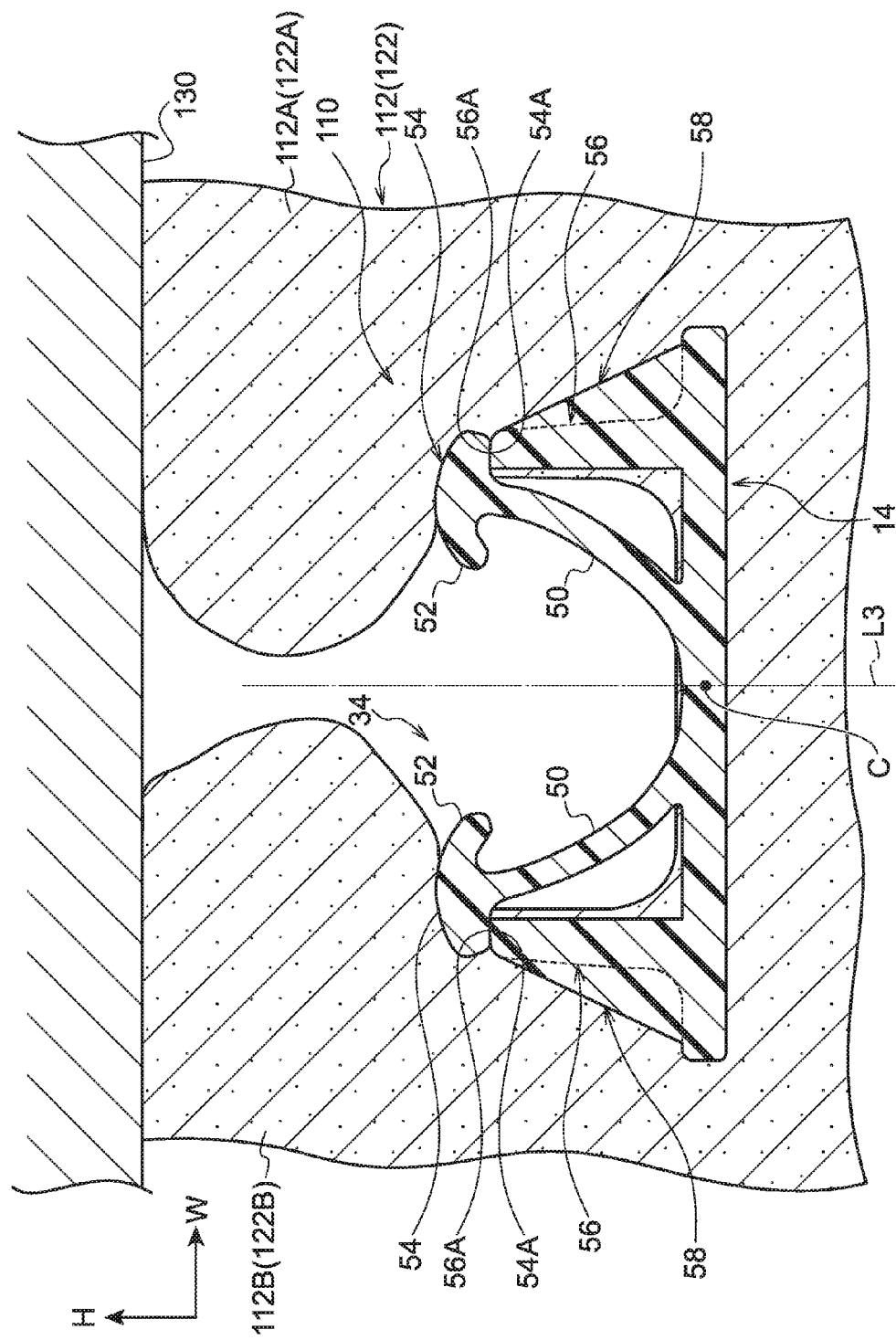
FIG. 1 is a cross-section illustrating a clip according to an exemplary embodiment of the present invention.

Explanation follows regarding an example of a cover anchor clip according to an exemplary embodiment of the present invention, with reference to FIG. 1 to FIG. 12. Note that in the drawings, the arrow H indicates an up-down direction of the cover anchor clip, the arrow W indicates a width direction of the cover anchor clip, and the arrow L indicates a front-rear direction of the cover anchor clip.

In the exemplary embodiments, when "an up-down direction", "a width direction", and "a front-rear direction" are used, the respective directions mean the directions with respect to the cover anchor clip of the exemplary embodiment.

Overall Configuration

Figure 12:
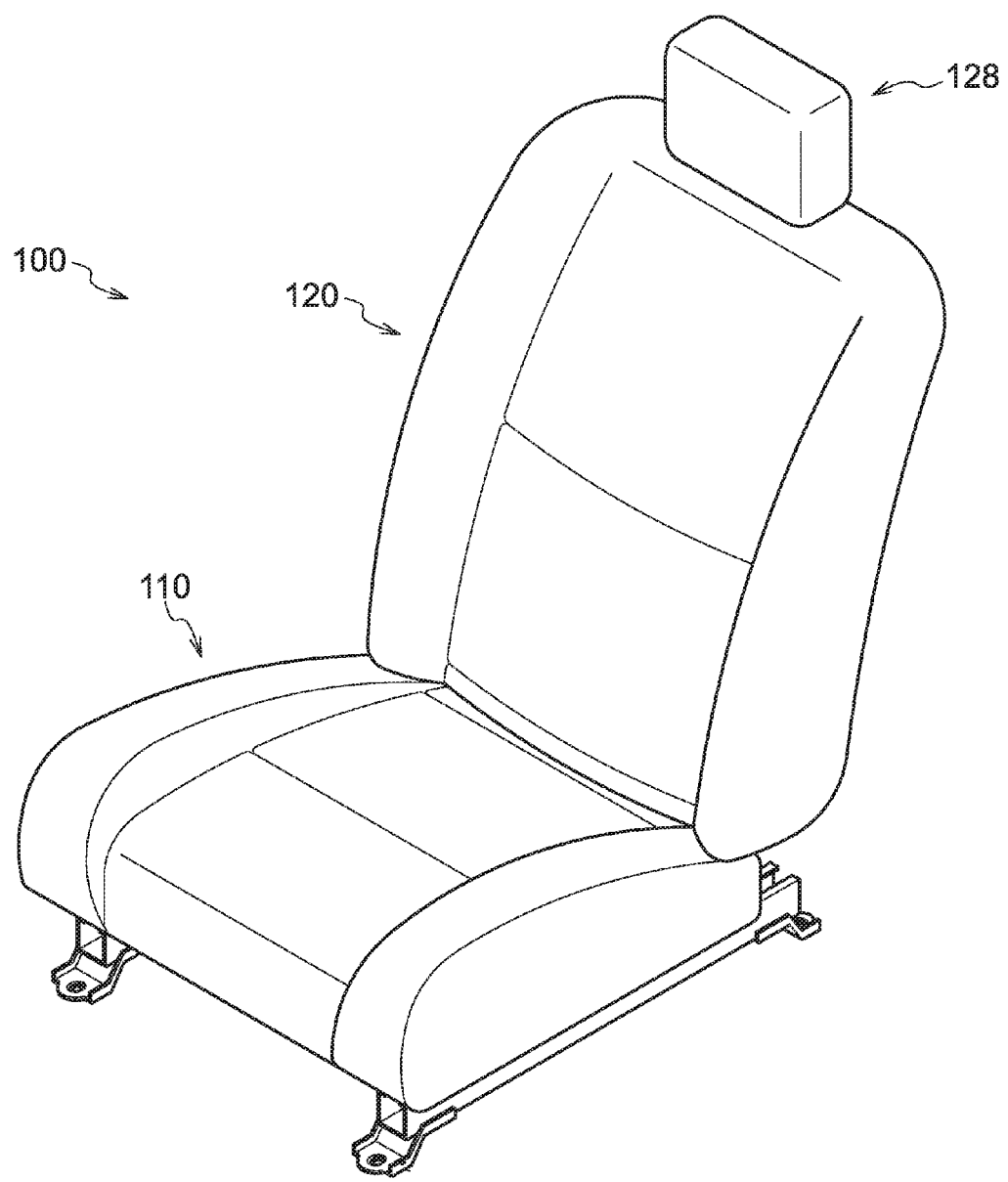
FIG. 12 is a perspective view illustrating a seat employing a clip according to an exemplary embodiment of the present invention.

First, explanation follows regarding a vehicle seat 100 in which a cover anchor clip 10 (referred to below simply as "clip 10") is employed. As illustrated in FIG. 12, the seat 100 includes a cushion section 110, a back section 120, and a headrest 128 that respectively support the buttocks or the like, the back and lumbar region or the like, and the head of an occupant.

Figure 11:
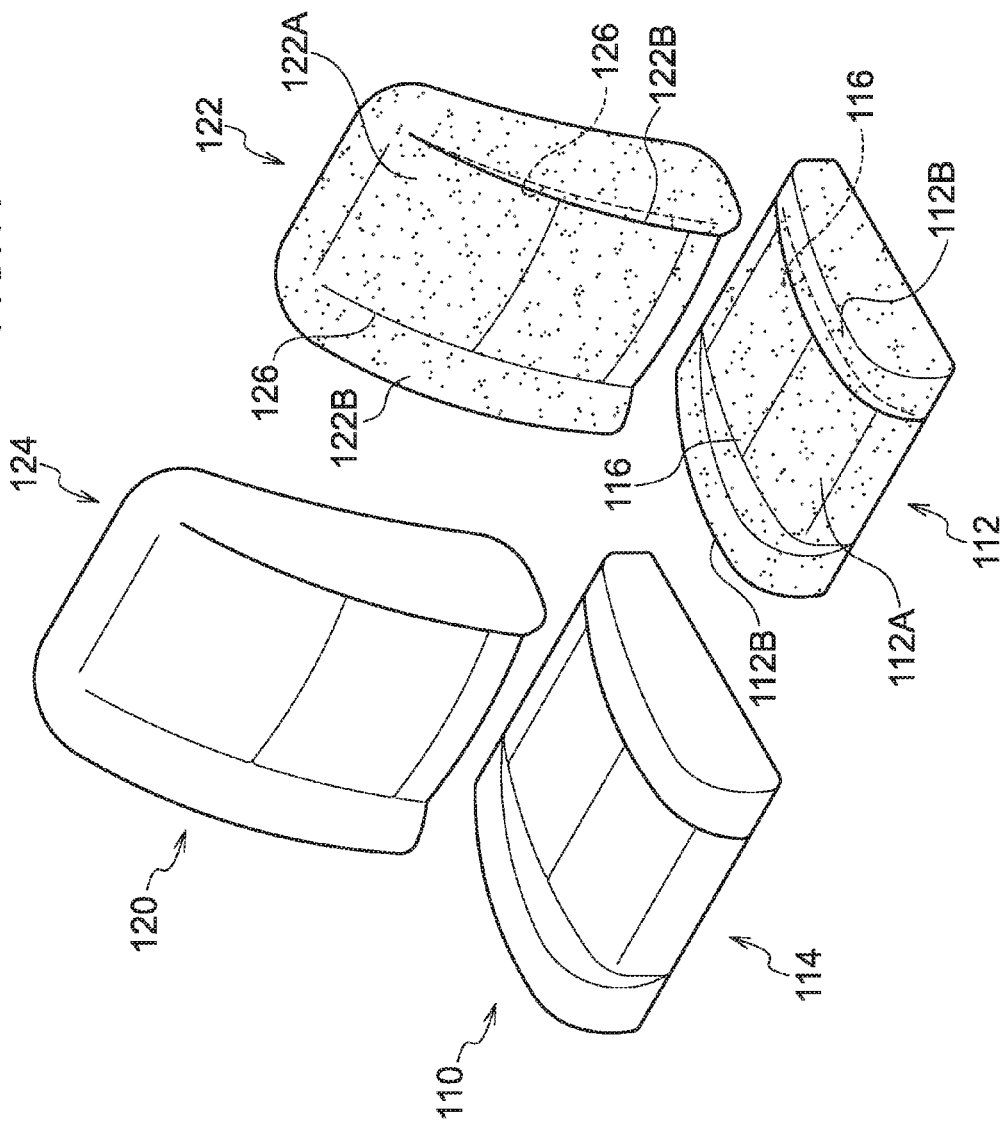
FIG. 11 is an exploded perspective view illustrating a seat employing a clip according to an exemplary embodiment of the present invention.

As illustrated in FIG. 11, the cushion section 110 includes a cushion 112 (an example of a foam body) and a cover 114. Moreover, the cushion 112 includes a main portion 112A and a pair of support portions 112B disposed on either side of the main portion 112A in the width direction thereof.

Grooves 116 are formed between the respective support portions 112B and the main portion 112A, and the clips 10 are disposed at a bottom of the grooves 116. Specifically, when foam molding the cushion 112, the clips 10 are inserted in the mold so as to dispose the clips 10 at the bottom of the grooves 116 (see FIG. 2).

Figure 5:
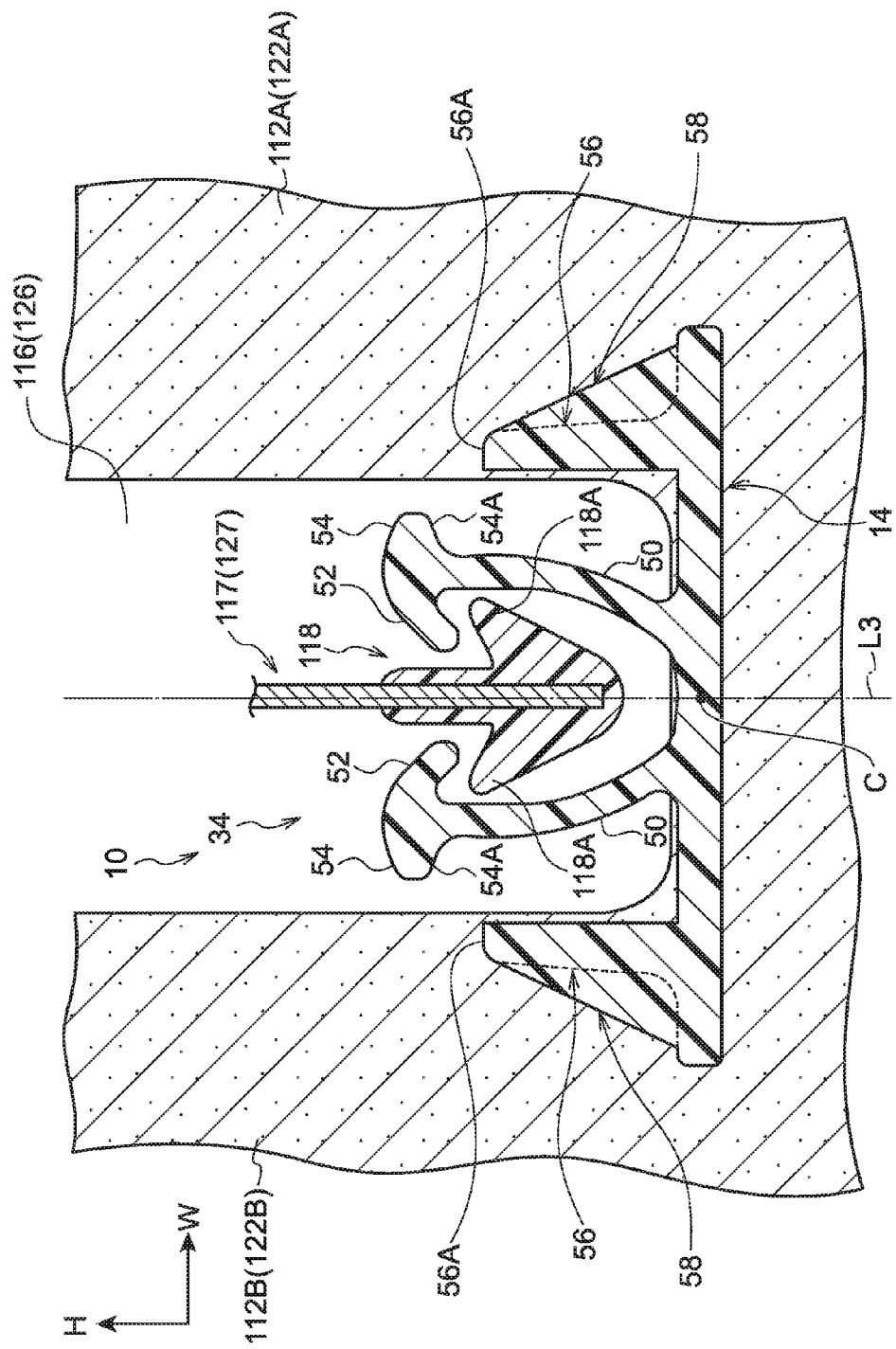
FIG. 5 is a cross-section illustrating a clip according to an exemplary embodiment of the present invention.
Figure 6:
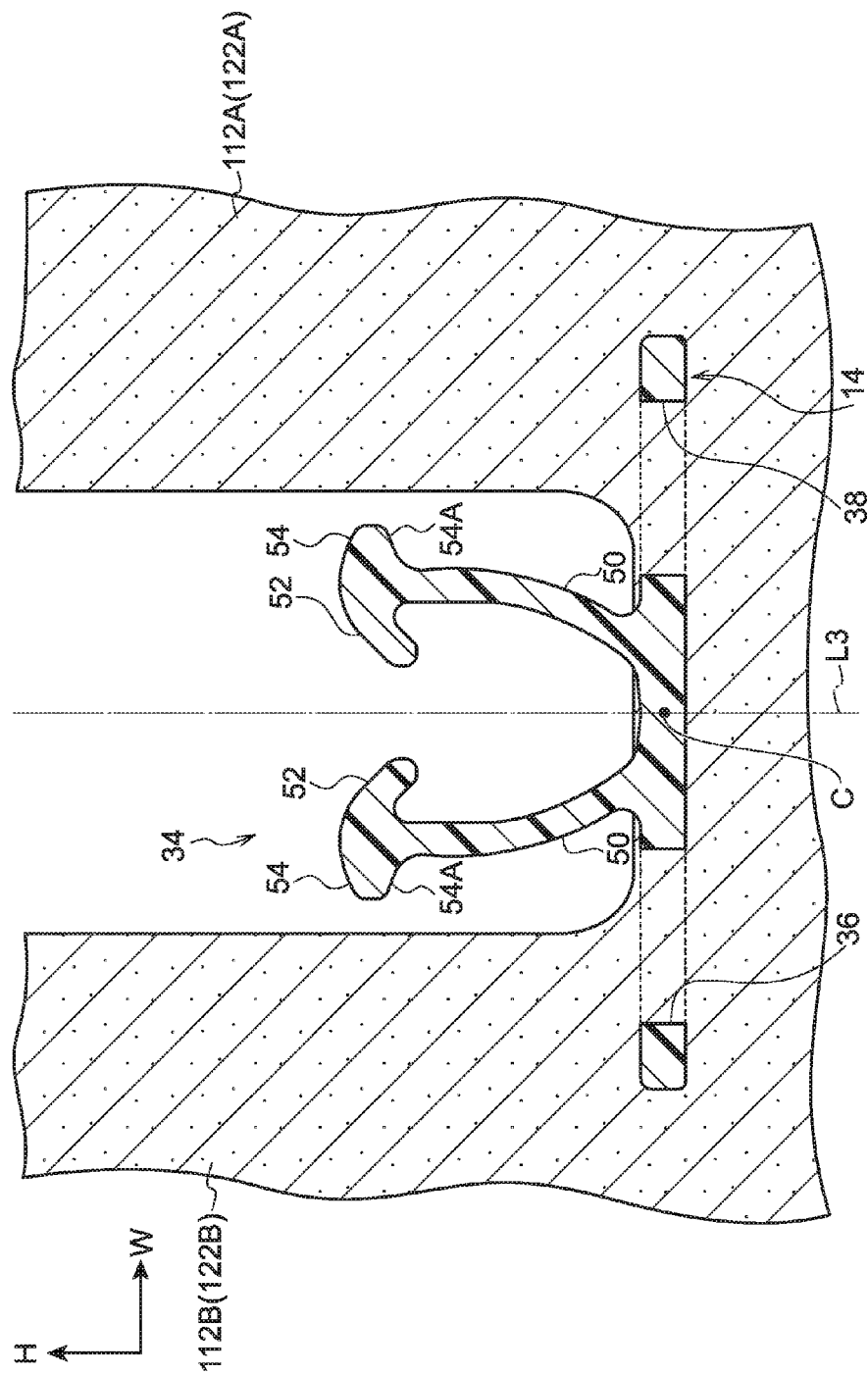
FIG. 6 is a cross-section illustrating a clip according to an exemplary embodiment of the present invention.

Suspenders 118, serving as examples of an anchored portion and fixed to a sheet member 117 attached to the cover 114, are attached to the clips 10 (see FIG. 5). Note that the suspenders 118 and the clips 10 are described in detail later.

Similarly, as illustrated in FIG. 11, the back section 120 includes a cushion 122 (an example of a foam body) and a cover 124. The cushion 122 includes a main portion 122A and a pair of support portions 122B disposed on either side of the main portion 122A in the width direction thereof.

Grooves 126 are formed between the respective support portions 122B and the main portion 122A, and the clips 10 are disposed at a bottom of the grooves 126. Specifically, when foam molding the cushion 122, the clips 10 are inserted in the mold so as to dispose the clips 10 at the bottom of the grooves 126 (see FIG. 2).

Suspenders 118, that are fixed to a sheet member 127 attached to the cover 124, are attached to the clip 10 (see FIG. 5). Note that the suspenders 118 and the clips 10 are described in detail later.

Suspender

Each of the suspenders 118 extends along a bottom face of the groove 116, 126 and is tapered at a leading end side, as illustrated in FIG. 5. A pair of protrusions 118A are formed projecting toward the outside (left-right direction sides in FIG. 5) at a portion on a base end side of each suspender 118.

Clip

Figure 9:
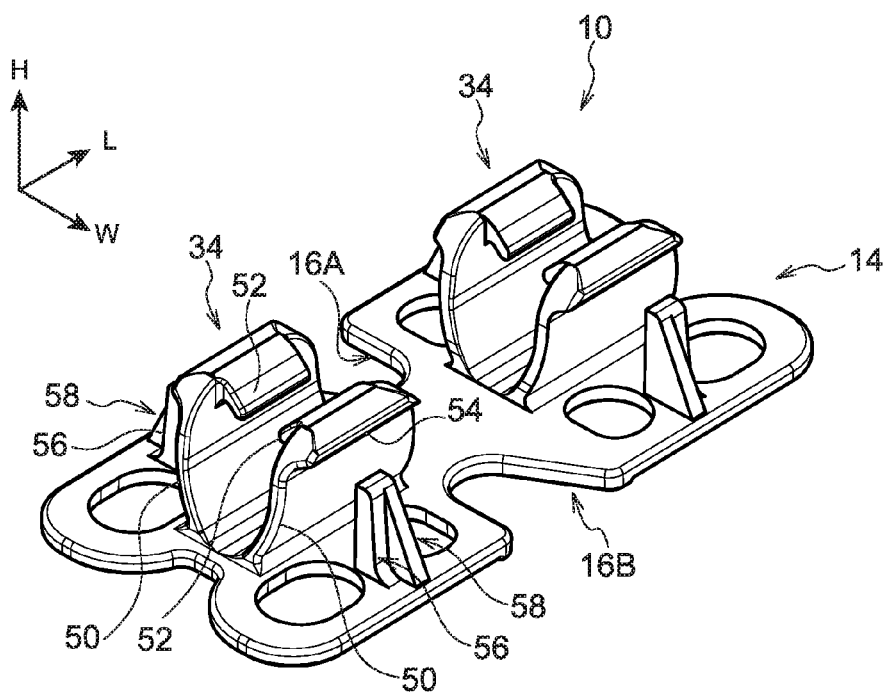
FIG. 9 is a perspective view illustrating a clip according to an exemplary embodiment of the present invention, as viewed from an upper side.

Each clip 10 is integrally formed from a resin material, and, as illustrated in FIG. 9, includes a plate shaped base section 14 that is retained by the cushions 112, 122 (see FIG. 11), and two anchor portions 34 standing out from a front face of the base section 14 toward the upper side.

Base Section

Figure 7:
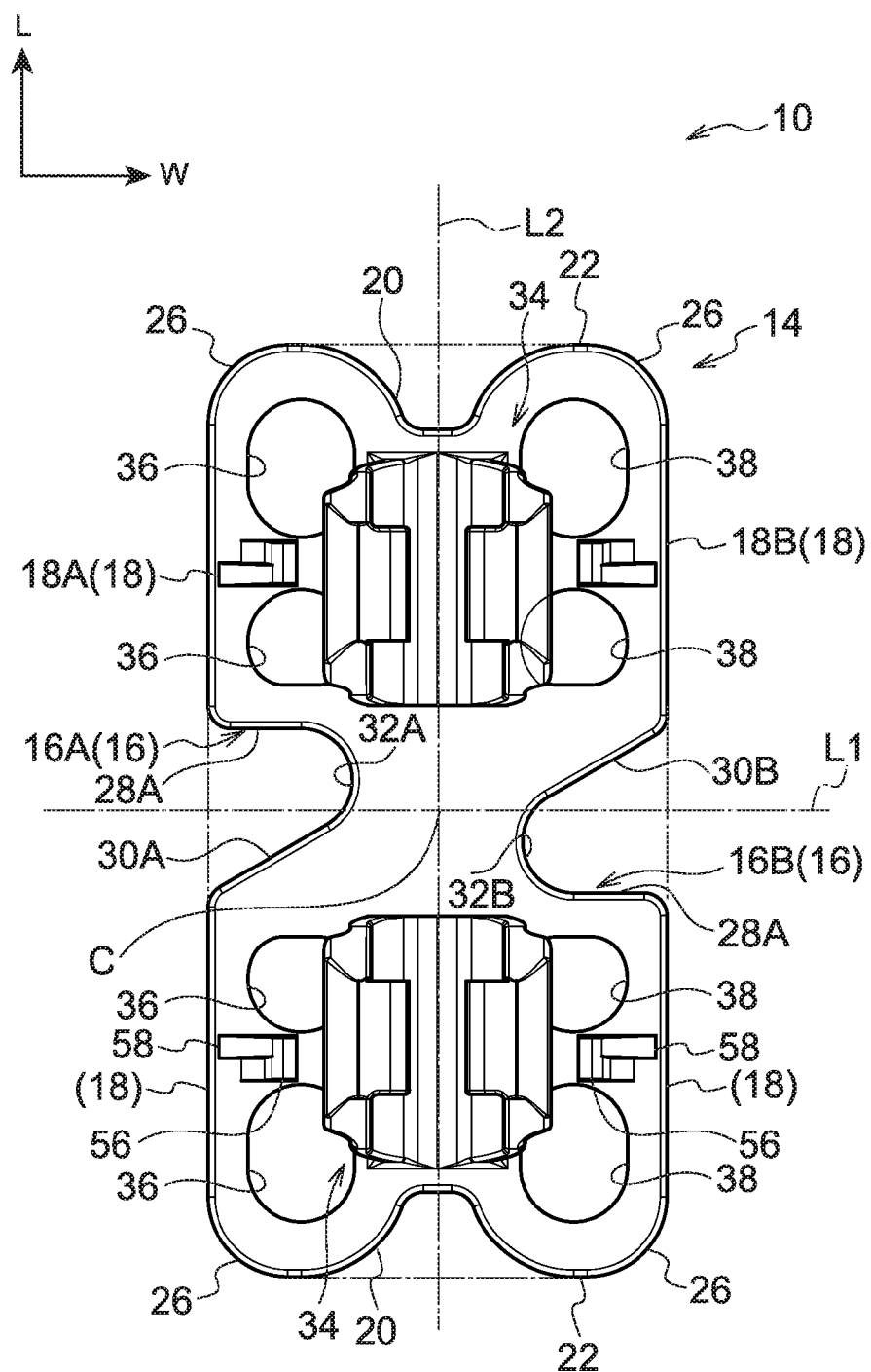
FIG. 7 is a plan view illustrating a clip according to an exemplary embodiment of the present invention.

A plate face of the base section 14 faces in the up-down direction and extends in the front-rear direction (a length direction), and the base section 14 is formed by a rectangular plate body extending in the front-rear direction. Furthermore, as illustrated in FIG. 7, the base section 14 includes a pair of edges 18 that extend in the front-rear direction and that are each formed with a notch 16, and a pair of edges 22 that couple the pair of edges 18 together at both end portions thereof and that are each formed with a notch 20.

Specifically, the respective edges 18 and the respective edges 22 are coupled together through circular arc shaped edges 26. Moreover, the notch 20 formed to one of the edges 22 and the notch 20 formed to the other of the edges 22 are each has recessed shape as viewed from the upper side and are formed symmetrically to each other about a center line L1 of the base section 14 extending in the width direction. Note that the center line L1 passes through the center C (centroid) of the base section 14, and is a straight line extending in the width direction.

A notch 16A formed to one of the edges 18A and a notch 16B formed to the other of the edges 18B are each has recessed shapes as viewed from the upper side and are disposed at a central portion in the front-rear direction. The notch 16A and the notch 16B are asymmetrical to each other about a center line L2 of the base section 14 extending in the front-rear direction. Note that the center line L2 passes through the center C (centroid) of the base section 14, and is a straight line extending in the front-rear direction.

The notches 16A, 16B include straight line portions 28A, 28B extending in the width direction, angled portions 30A, 30B angled with respect to the width direction, and circular arc portions 32A, 32B that couple leading end sides of the straight line portions 28A, 28B together with leading end sides of the angled portions 30A, 30B. In the present exemplary embodiment, as viewed from the upper side, the notch 16A and the notch 16B are formed with point symmetry about the center C of the base section 14, and the circular arc portion 32A of the notch 16A is disposed on one side of the center line L1, and the circular arc portion 32B of the notch 16B is disposed on the other side of the center line L1.

The base section 14 is formed with four through holes 36 in a line along the one edge 18A, and four through holes 38 in a line along the other edge 18B. Namely, the through holes 36, 38 are formed in respective lines along the front-rear direction, in plural rows across the width direction (two rows in the present exemplary embodiment). The foam bodies enter the through holes 36, 38 (see FIG. 6) during foam molding of the cushions 112, 122 (see FIG. 11).

Figure 10:
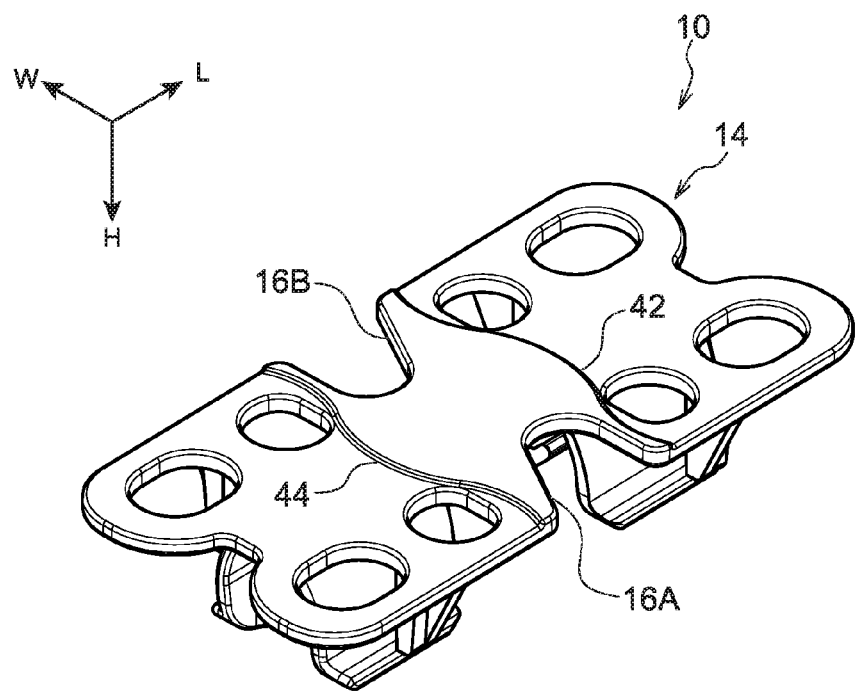
FIG. 10 is a perspective view illustrating a clip according to an exemplary embodiment of the present invention, as viewed from a lower side.

As illustrated in FIG. 10, step portions 42, 44 (examples of portions where a plate thickness changes) where the plate thickness of the base section 14 changes are formed to a back face of the base section 14, that is an opposite side face to the face on which the anchor portions 34 are disposed. In the present exemplary embodiment, a front-rear direction central portion of the base section 14 has a plate thickness of 1.2 mm, and other general portions of the base section 14 have a plate thickness of 1.0 mm.

Figure 8:
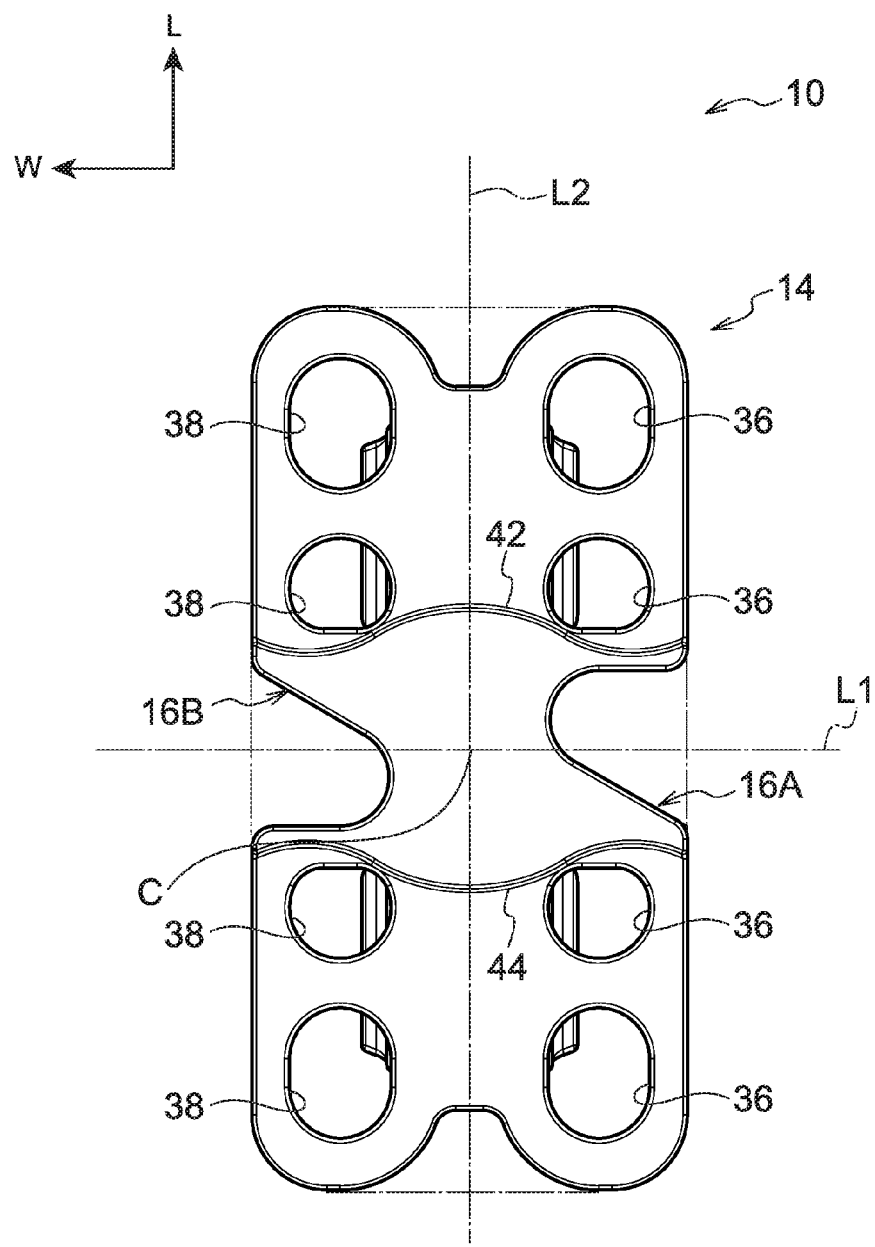
FIG. 8 is a bottom view illustrating a clip according to an exemplary embodiment of the present invention.

Specifically, as viewed from the lower side, as illustrated in FIG. 8, the step portion 42 is disposed on one side of the center line L1, and the step portion 44 is disposed on the other side of the center line L1. A portion of the base section 14 between the step portion 42 and the step portion 44 has a plate thickness of 1.2 mm.

Figure 2:
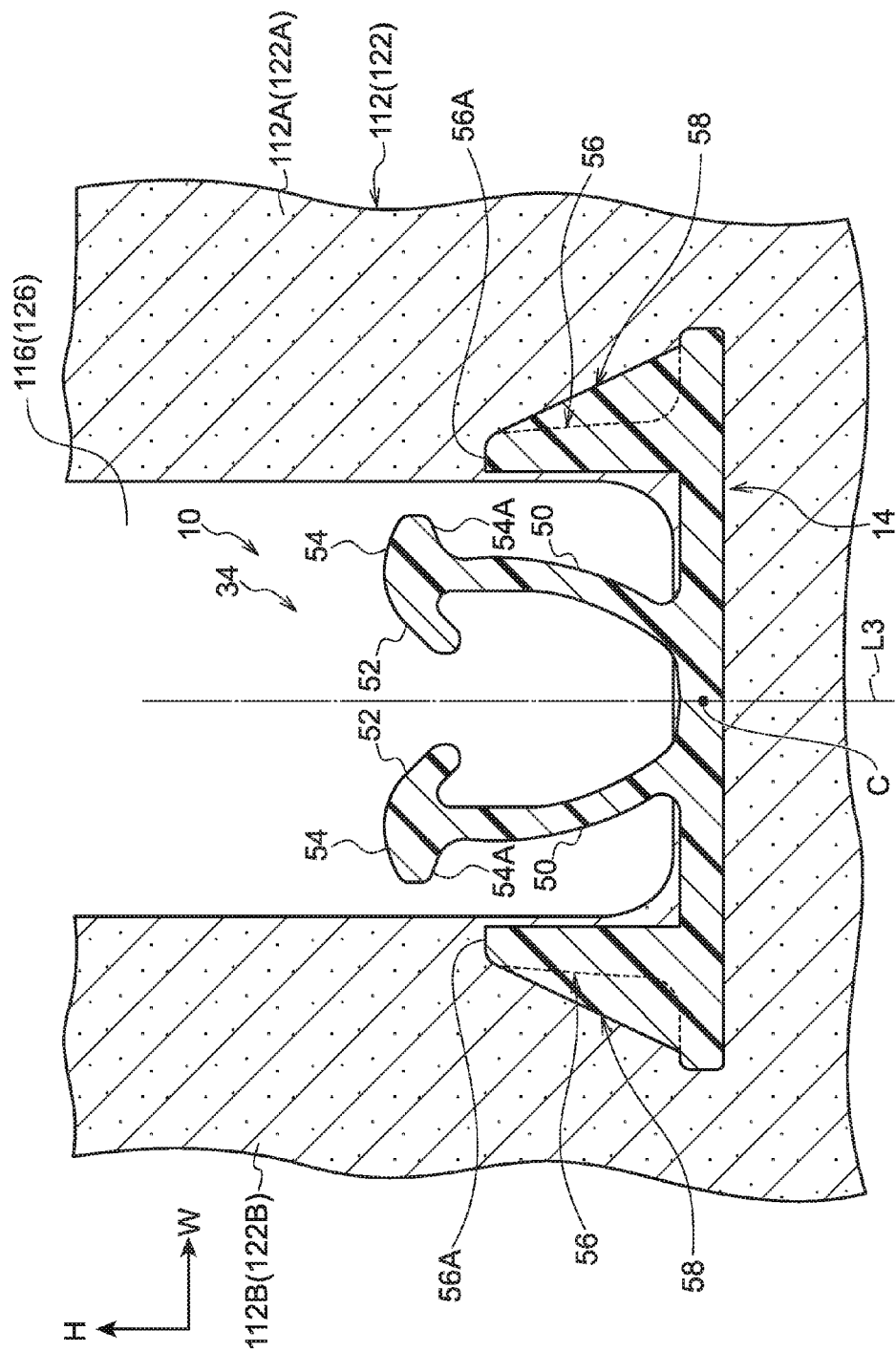
FIG. 2 is a cross-section illustrating a clip according to an exemplary embodiment of the present invention.

In this configuration, in a state in which the respective clips 10 are disposed in the cushions 112, 122, as illustrated in FIG. 2, the base sections 14 are disposed so as to extend running along the bottom faces of the grooves 116, 126 of the cushions 112, 122.

Anchor Portion

As illustrated in FIG. 9, two of the anchor portions 34 are disposed side-by-side in the front-rear direction, standing out from the front face of the base section 14 toward the upper side. As illustrated in FIG. 7, one anchor portion 34 and the other anchor portion 34 are disposed on either side of the center line L1. The notches 16A, 16B are disposed between the one anchor portion 34 and the other anchor portion 34. Since each of the anchor portions 34 is configured with a similar shape, explanation follows regarding the one anchor portion 34.

As illustrated in FIG. 2 and FIG. 9, each anchor portion 34 includes a pair of extension portions 50 standing out from the front face of the base section 14 and disposed facing each other, and a pair of anchor claws 52 that are respectively formed to leading ends of the extension portions 50 and that fit around and anchor the suspenders 118 mentioned above.

The pair of extension portions 50 and the pair of anchor claws 52 are symmetrical to each other about a center line L3 (see FIG. 2) of the base section 14 extending in the up-down direction. Note that the center line L3 passes through the center C (centroid) of the base section 14 and is a straight line extending in the up-down direction.

The pair of extension portions 50 are angled toward the width direction outside so as to be further apart from each other at leading end than at base end thereof. The respective extension portions 50 are curved so as to protrude toward the width direction outside. The respective extension portions 50 are capable of undergoing elastic deformation such that the leading ends of the respective extension portions 50 move away from each other.

Furthermore, the anchor claws 52 are formed to the leading ends of the respective extension portions 50 such that leading edges of the pair of anchor claws 52 approach each other.

In this configuration, in a state in which the clips 10 are disposed in the cushions 112, 122, as illustrated in FIG. 2, the anchor portions 34 are disposed in the grooves 116, 126 of the cushions 112, 122, and are exposed from the foam body to the exterior.

Figure 4:
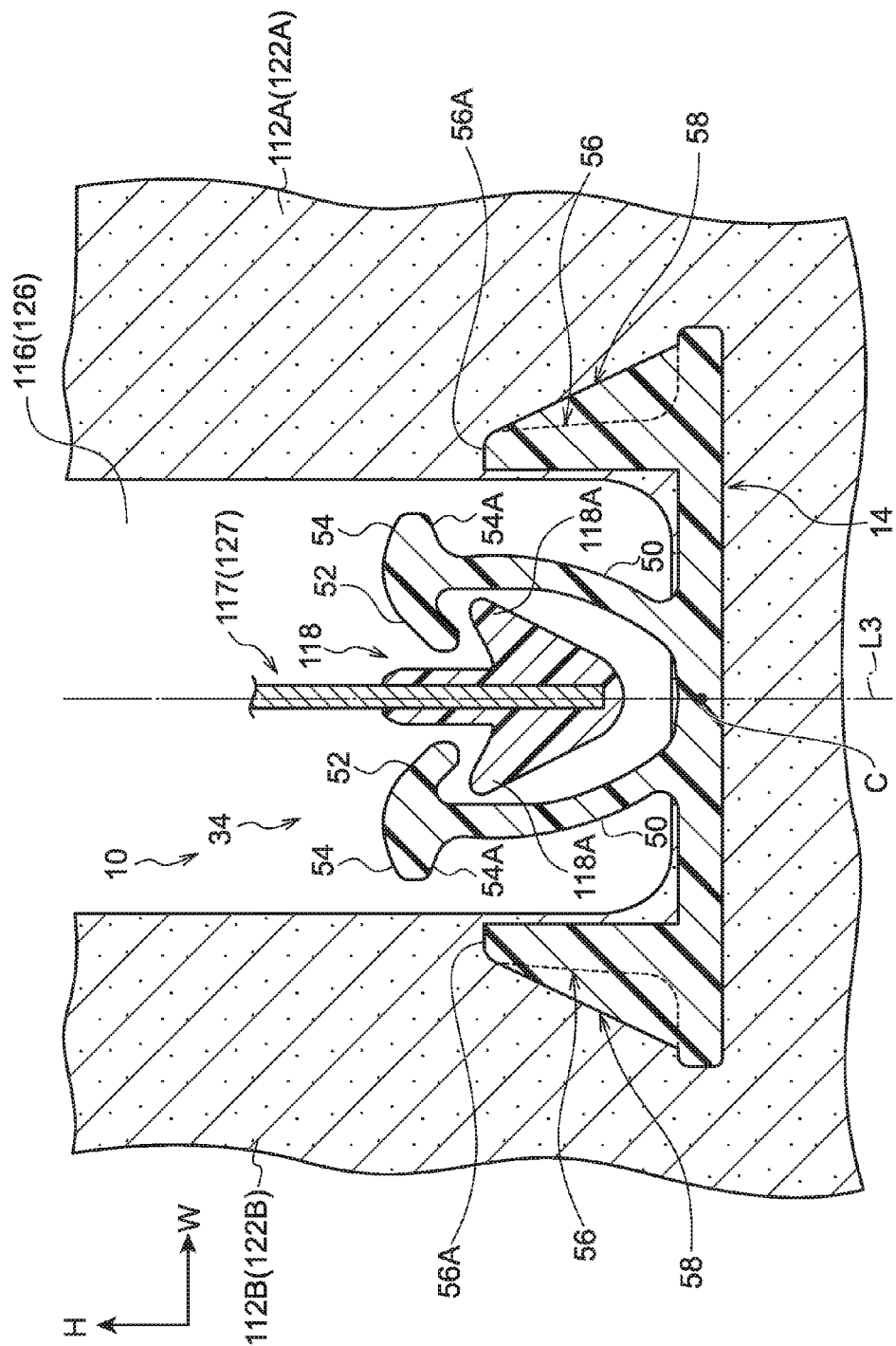
FIG. 4 is a cross-section illustrating a clip according to an exemplary embodiment of the present invention.

In order to fit the pair of anchor claws 52 around and anchor the suspender 118, as illustrated in FIG. 4 and FIG. 5, the respective extension portions 50 elastically deform such that the pair of anchor claws 52 move away from each other.

Other

Protrusions 54 are respectively formed to the leading ends of the pair of extension portions 50.

As illustrated in FIG. 5, the protrusions 54 protrude out toward the opposite sides to the side at which the extension portions 50 face each other (opposite side to the side formed with the anchor claws 52), and each protrusion 54 is formed with a lower face 54A (an example of a contact face) facing the lower side.

The clip 10 includes pairs of upstanding portions 56 that stand out from the base section 14 toward the upper side in the up-down direction (an example of an upstanding direction), and that are respectively disposed on the width direction outside of each extension portion 50. Leading end portions of each pair of upstanding portions 56 are formed with top faces 56A facing the upper side in the up-down direction.

Furthermore, a triangular rib 58 supporting the upstanding portion 56 is formed on the width direction outside of each upstanding portion 56.

In this configuration, in a state in which the clips 10 are disposed in the cushions 112, 122, as illustrated in FIG. 5, the upstanding portions 56 are disposed inside the cushions 112, 122.

When the extension portions 50 elastically deform such that the pair of anchor claws 52 move away from each other, as illustrated in FIG. 1, the lower faces 54A of the protrusions 54 can contact the top faces 56A of the upstanding portions 56 so as to make face-to-face contact.

Gaps 60 are formed between the respective lower faces 54A and top faces 56A in a state in which the respective extension portions 50 have undergone elastic deformation in order to insert and anchor the suspender 118 between the pair of anchor claws 52 (see FIG. 4).

Operation

Next, explanation follows regarding operation of the clip 10, with reference to an operation to attach the suspender 118, which is fixed to the sheet members 117, 127, to the clips 10, and to roller crushing performed following molding of the cushions 112, 122.

Attachment Operation

Figure 3:
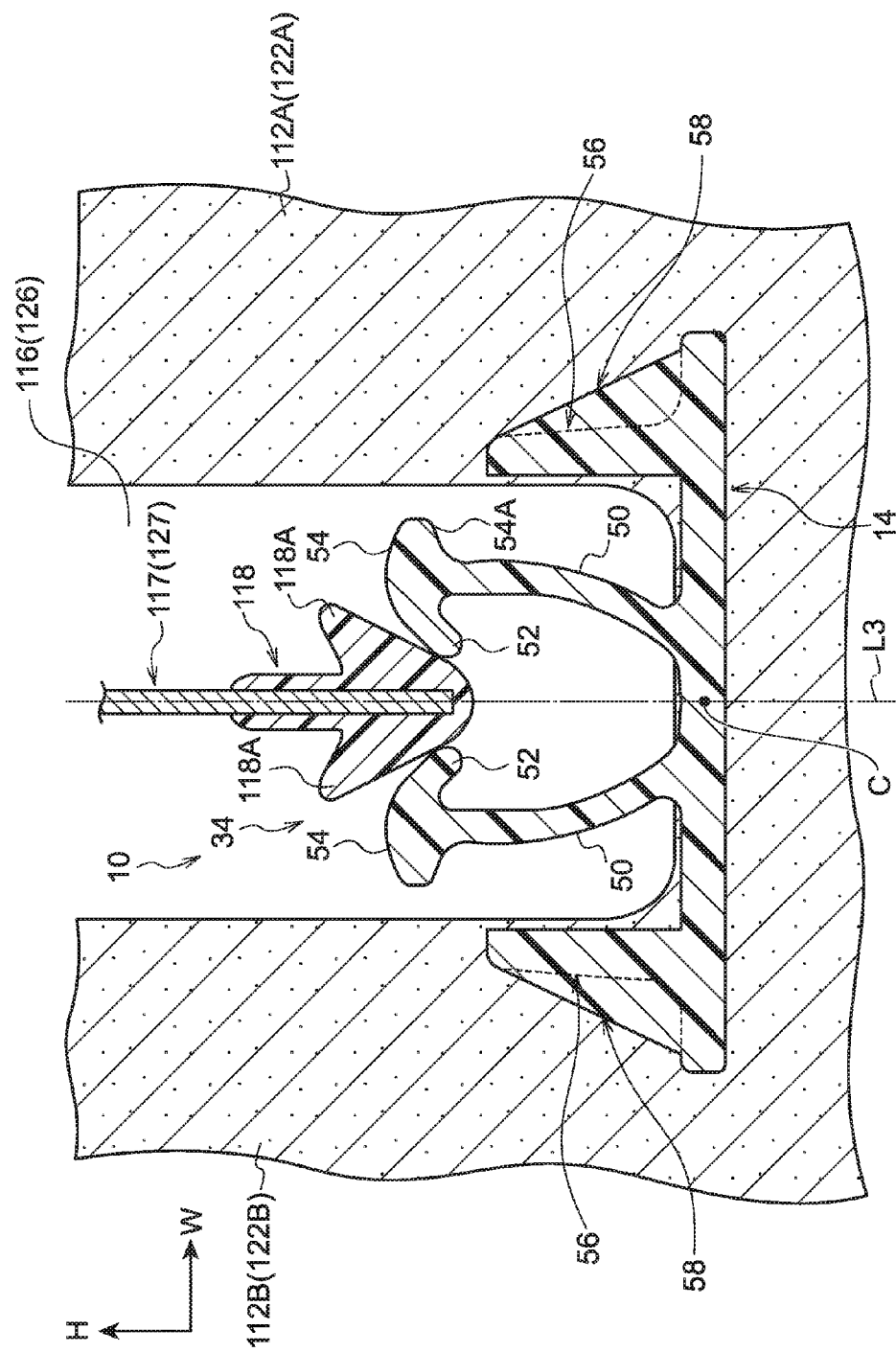
FIG. 3 is a cross-section illustrating a clip according to an exemplary embodiment of the present invention.

When attaching the suspender 118 to the clips 10, as illustrated in FIG. 3, the suspender 118 is inserted into the groove 116, 126. When the suspender 118 is inserted into the groove 116, 126, the tapered leading end portion of the suspender 118 contacts the pairs of anchor claws 52 of the respective clips 10.

When the suspender 118 is inserted further toward the bottom of the groove 116, 126, as illustrated in FIG. 4, the pairs of anchor claws 52 are pressed by the suspender 118 and the extension portions 50 elastically deform such that the pairs of anchor claws 52 move away from each other. The suspender 118 is thereby allowed to pass between the pairs of anchor claws 52. When this occurs, the lower faces 54A of the protrusions 54 and the top faces 56A of the upstanding portions 56 are not in contact, and the gap 60 is formed between each lower face 54A and top face 56A.

When the protrusions 118A of the suspender 118 pass between the pairs of anchor claws 52, as illustrated in FIG.

5, the extension portions 50 undergo elastic recovery, such that the pairs of anchor claws 52 fit around and anchor the suspender 118. The suspender 118 is thereby attached to the clip 10.

The attachment operation to attach the suspender 118 to the clip 10 is thereby completed.

Roller Crushing

When roller crushing is performed following formation of the cushions 112, 122, as illustrated in FIG. 1, a roller 130 is rolled over the cushions 112, 122 while pressing on the surfaces of the cushions 112, 122. The size of air bubbles contained in the cushions 112, 122 is thereby regulated.

Note that the cushions 112, 122 are pressed due to the roller 130 pressing on the surfaces of the cushions 112, 122, and the pressing force from the roller 130 is transmitted to the anchor portions 34 from the up-down direction upper side.

Specifically, a pressing force pressing the extension portions 50 toward the lower side acts through the anchor claws 52 and the protrusions 54. As mentioned above, the pair of extension portions 50 is angled toward the width direction outside so as to be further apart from each other at the leading end than at the base end. The respective extension portions 50 thereby undergo elastic deformation such that the leading ends of the extension portions 50 move away from each other. The lower faces 54A of the protrusions 54 make face-to-face contact with the top faces 56A of the upstanding portions 56. The elastic deformation of the extension portions 50 is thereby limited, such that the extension portions 50 are suppressed from being excessively deformed. Note that pressing force pressing the upstanding portions 56 toward the lower side acts through the protrusions 54.

When the pressing force from the roller 130 on the clip 10 is released, as illustrated in FIG. 2, the extension portions 50 undergo elastic recovery.

Advantageous Effects

As explained above, when roller crushing is performed following formation of the cushions 112, 122, the extension portions 50 undergo elastic deformation such that the pair of anchor claws 52 move away from each other and the protrusions 54 make contact with the upstanding portions 56. The extension portions 50 are suppressed from being excessively deformed. This thereby enables damage to the clip 10 when performing roller crushing to be suppressed.

When the protrusions 54 make contact with the upstanding portions 56, the lower faces 54A of the protrusions 54 make contact with the top faces 56A of the upstanding portions 56. Note that the upstanding portions 56 stand out from the front face of the base section 14 in the up-down direction, and the top faces 56A formed to portions on the leading end of the upstanding portions 56 face toward the upper side. Even when, through the protrusions 54, pressing force pressing toward the lower side is transmitted into the upstanding portions 56 through the top faces 56A when performing roller crushing, the upstanding portions 56 can be suppressed from undergoing deformation compared to in cases in which the upstanding portions 56 are angled with respect to the up-down direction.

The gaps 60 are formed between the lower faces 54A and the top faces 56A in a state in which the respective extension portions 50 have undergone elastic deformation in order to insert and anchor the suspender 118 between the pair of anchor claws 52. An efficiency of the attachment operation of the suspender 118 to the clips 10 can thereby be not affected.

The pair of extension portions 50 are angled toward the width direction outside so as to be further apart from each other at the leading end than at the base end. This thereby enables the extension portions 50 to undergo elastic deformation such that the pair of anchor claws 52 moves away from each other when pressing force pressing toward the lower side is transmitted to the extension portions 50.

Note that detailed explanation has been given regarding a particular exemplary embodiment of the present invention; however, the present invention is not limited to this exemplary embodiment, and it would be obvious to a practitioner skilled in the art that various other exemplary embodiments may be implemented within the scope of the present invention. For example, in the exemplary embodiment explained above, explanation has been given of an example of a case in which the clip 10 is employed in the vehicle seat 100; however, the clip 10 may be employed in other seats (chairs) such as an office chair, a home sofa, or a legless chair.

In the exemplary embodiment explained above, two of the anchor portions 34 are provided to each clip 10; however, one, or three or more of the anchor portions 34 may be provided.

What is claimed is:

1. A cover anchor clip comprising:
   a plate shaped base section for retention in a foam body;
   an anchor portion including
      a pair of extension portions that stands up from the base section and that are disposed facing each other,
      a pair of anchor claws that are formed at respective leading ends of the pair of extension portions, and that project out toward sides in which the extension portions mutually face each other so that the pair of anchor claws are configured to anchor an anchored member attached to a cover for covering the foam body when the anchored member is inserted between the pair of anchor claws, and
      a protrusion that is formed at each of the respective leading ends of the pair of extension portions and that projects out to the opposite side to the mutually facing sides of the pair of extension portions; and
   upstanding portions respectively standing up from the base section and able to make contact with the protrusions in the event that either one of the extension portions undergoes elastic deformation such that the pair of anchor claws move away from each other,
   wherein the plate shaped base section and the anchor portion are formed as one piece, and wherein a plate face of the base section extends between each of the extension portions and each of the upstanding portions.

2. The cover anchor clip of claim 1, wherein:
   a top face is formed at each of the respective leading ends of the upstanding portions so as to face toward an upstanding direction the upstanding portion stands up in; and
   a contact face is formed at each of the protrusions so as to make contact with the top face.

3. The cover anchor clip of claim 1, wherein, in a state in which the pair of extension portions undergo elastic deformation in order to insert and anchor the anchored member between the pair of anchor claws, a gap is respectively formed between the protrusion and the upstanding portion.

4. The cover anchor clip of claim 1, wherein the pair of extension portions is angled so as to be further apart from each other at leading ends thereof than at base ends thereof.

* * * * *